Figure 1:
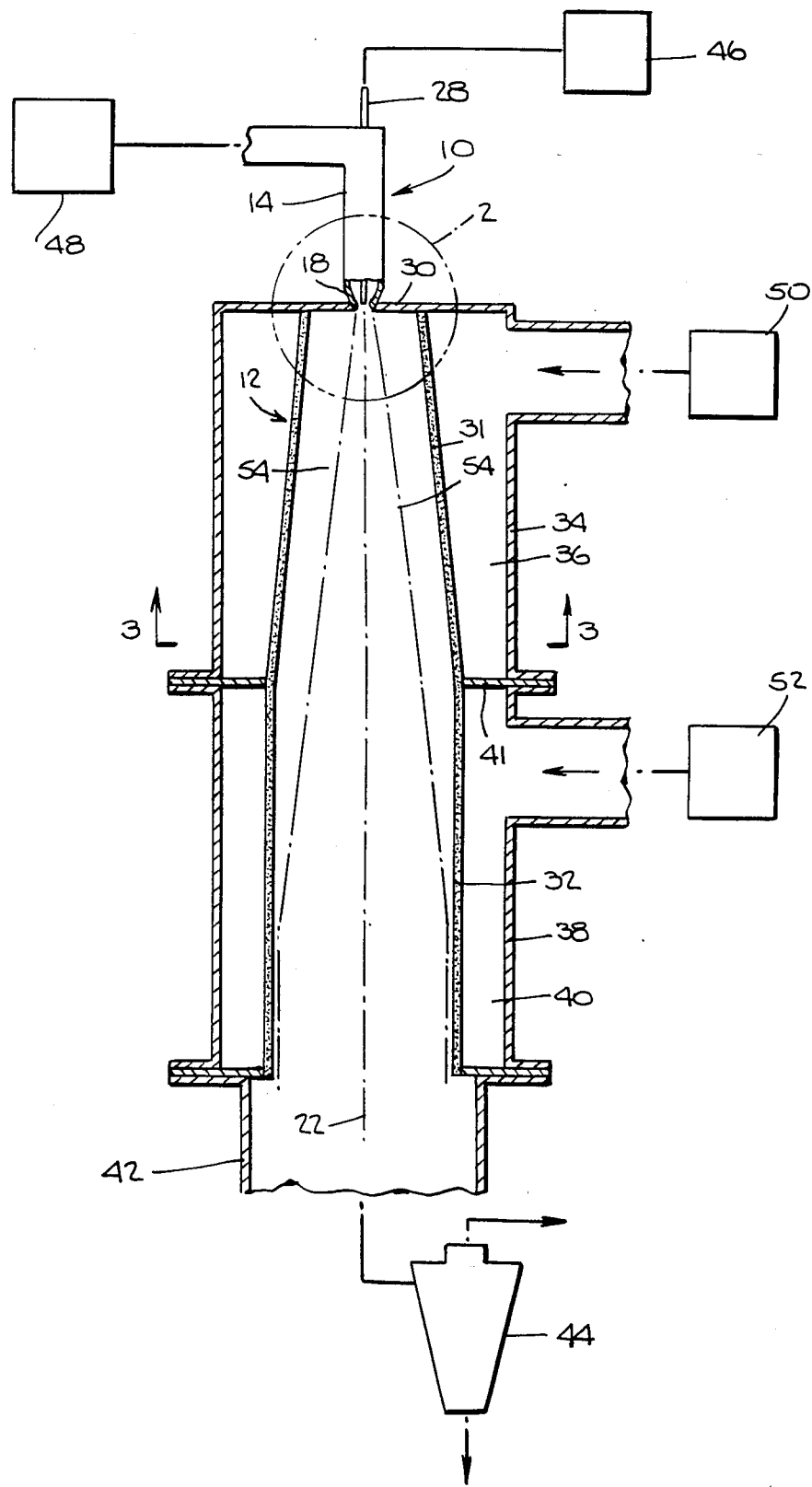

United States Patent [19]

Tuot

[11] Patent Number: 4,702,799
[45] Date of Patent: Oct. 27, 1987

[54] DRYER AND DRYING METHOD

[75] Inventor: James Tuot, Dublin, Ohio

[73] Assignee: Nestec S.A., Vevey, Switzerland

[21] Appl. No.: 772,150

[22] Filed: Sep. 3, 1985

[51] Int. Cl.⁴ .............................................. B01D 1/14
[52] U.S. Cl. ................................... 159/48.1; 159/4.01;
159/16.1; 159/DIG. 2; 159/DIG. 28; 203/90;
202/236; 34/57 R; 426/471
[58] Field of Search ...................... 159/4.01, 16.1, 4.4,
16.3; 43.1, 4.08, 4.05; 34/57 A, 57 R, 10, 57 B;
202/236; 203/90; 426/471, 474

[56] References Cited

U.S. PATENT DOCUMENTS

| | | | |
|---|---|---|---|
| 1,432,635 | 10/1922 | Stevens | 159/4.4 |
| 2,297,726 | 10/1942 | Stephanoff | 159/4.1 |
| 2,353,459 | 7/1944 | Gruber | 159/4.1 |
| 2,859,155 | 11/1958 | Cichelli et al. | 159/4.4 |
| 2,868,523 | 1/1959 | Cundiff et al. | 159/4.4 |
| 3,083,099 | 3/1963 | Swanson et al. | 159/4.1 |
| 3,620,776 | 11/1971 | Miskin et al. | 159/48.1 |
| 4,020,564 | 5/1977 | Bayliss | 34/57 R |
| 4,187,617 | 2/1980 | Becker, Jr. et al. | 159/4.02 |
| 4,229,249 | 10/1980 | Felsvang et al. | 159/4.1 |
| 4,323,424 | 4/1982 | Secunda et al. | 159/48.1 |
| 4,361,965 | 12/1982 | Goumondy et al. | 34/57 R |
| 4,376,010 | 3/1983 | Gauvin | 159/4.4 |
| 4,380,491 | 4/1983 | Joy et al. | 159/4.01 |

FOREIGN PATENT DOCUMENTS 0599890 6/1980 Canada ............................. 426/471

OTHER PUBLICATIONS

Torck et al., "Methanol for Motor Fuel Via the Ethers Route", *Chemical Engineering Progress*, Aug. 1982, pp. 36–45.

*Primary Examiner*—S. Leon Bashore
*Assistant Examiner*—V. Manoharan
*Attorney, Agent, or Firm*—Vogt & O'Donnell

[57] ABSTRACT

A finely atomized liquid is projected in a stream and dried by contact with drying gas. The drying gas is projected in turbulent flow from opposite sides of the stream such flow being distributed along the length of the stream. The material may be atomized and projected by a jet of gas issuing from a nozzle, and the drying gas may be projected around the jet so that the drying gas meets the entrainment demand of the jet, thereby preventing recirculation of gases outside the jet.

23 Claims, 6 Dr

U.S. Patent   Oct. 27, 1987   Sheet 3 of 3   4,702,799

DRYER AND DRYING METHOD

The present invention relates to drying methods and apparatus.

Particulate materials are commonly formed by spray drying. A liquid is atomized to form droplets, and the droplets are exposed to a dry gas such as hot air. The liquid constituents of the droplets evaporate, leaving particles of dried material. In the food and beverage industry, this process is used to prepare products such as soluble coffee powder, dried milk and dried milk substitutes.

Spray drying typically has been performed by contacting the atomized liquid with hot air in a large, vertically extensive chamber or "tower". A tower-type dryer having sufficient capacity for an industrial process may be 20 meters high and 6 meters in diameter. Such large apparatus is expensive to construct.

Heating of the material in spray drying typically has adversely affected the quality of the dried product. Recirculation of air within the dryer may cause prolonged retention of dried particles within the dryer and hence may exacerbate the damage caused by heating. These difficulties are particularly significant in the food and beverage industry, as many comestible materials incorporate flavor constituents susceptible to loss or degradation upon heating.

U.S. Pat. No. 3,038,533 discloses a variant of the spray drying process wherein hot atomizing or "primary" air is discharged through a nozzle at a relatively high velocity. A liquid to be dried is atomized to minute droplets by the primary air as it passes through the nozzle. The minute droplets pass downstream in the jet of primary air issuing from the nozzle, and dry rapidly.

The primary air jet tends to create a region of partial vacuum adjacent the jet and hence tends to cause recirculation of the surrounding air. To avoid such recirculation, the patent proposes to direct the jet along the axis of a tubular chamber, and to blow additional or "secondary" air into the chamber co-directionally with the jet so that the jet is surrounded by the stream of secondary air.

Jet spray drying techniques as disclosed in the patent would appear to overcome some of the difficulties in conventional spray drying. However, such jet spray drying techniques entail drawbacks of their own. Dried material tends to accumulate on the wall of the tubular chamber. Moreover, jet spray drying techniques have not been suitable for processing materials which resist atomization to very fine droplets, such as highly concentrated beverage extracts. Consequently, there have been significant needs for improvements in spray drying methods and apparatus.

SUMMARY OF THE INVENTION

The present invention provides such improvements.

In a drying method according to the present invention, the liquid material to be dried is atomized, and a stream of atomized material is projected in a downstream direction. A drying gas is projected inwardly, toward the stream of atomized material, in turbulent flow transversely to the downstream direction from opposite sides of the stream. The inwardly flowing drying gas is distributed along the length or upstream-to-downstream extent of the stream so that as the atomized material moves downstream, it passes between opposing inward flows of drying gas. The atomized material and the gas are thus continually and vigorously agitated as the material passes downstream, thereby promoting rapid drying.

The material may be projected downstream by passing an impelling gas through a nozzle so that the impelling gas issues from the nozzle as a jet to entrain the material in the jet. The material may be entrained in the impelling gas upstream of the nozzle and atomized to fine droplets by the impelling gas as the gas and liquid pass through the nozzle.

When a jet of impelling gas is employed, the drying gas preferably is projected so that over at least the upstream portion of its length, the jet is entirely surrounded by inwardly flowing drying gas. Accordingly, entrainment of gas by the jet cannot create a region of partial vacuum adjacent the jet. Recirculation of gases and dried material associated with such regions of partial vacuum are therefore substantially eliminated. Moreover, the inwardly flowing drying gas tends to dissipate the jet, thereby further suppressing recirculation.

The drying gas thus induces turbulence but suppresses recirculation. Turbulence differs from recirculation. As used in this disclosure, the term "recirculation" refers to the action of an eddy which is stable and remains in a substantially fixed location for an appreciable time. The term "turbulence", as used in this disclosure, refers to the action of an eddy encompassed within a larger, surrounding, gas flow, so that the eddy moves with the larger flow. On a macroscopic basis, turbulence does not affect the movement of material entrained in the gas and does not promote repeated passage of material through the dryer.

According to a further aspect of the present invention, the temperature of the drying environment at each location along the length or upstream-to-downstream extent of the stream may be controlled as desired. Because the drying gas is distributed along the length of the stream and directed transversely of the stream, the atomized material is exposed at each location along the length of the stream, to gas at a temperature which varies with the temperature of the drying gas directed toward that location. By supplying drying gas at different temperatures to different regions of the stream, the atomized material may be exposed to different temperatures in pre-determined sequence as the material passes downstream. For example, by supplying relatively hot drying gas to an upstream region and relatively cool drying gas to a downstream region, the temperature in the downstream region may be limited to control the product temperature at the dryer outlet, while maintaining very high temperatures in the upstream region to promote rapid drying.

Drying is also promoted by fine atomization of the liquid. Processes according to the present invention, however, will still provide effective and rapid drying with droplets larger than those typically employed in prior jet-spray drying processes. Consequently, materials which are viscous or otherwise resistant to very fine atomization may be dried effectively. It is believed that the improved mixing and desirable gas temperatures attained in the preferred forms of the present invention contribute to this advantageous result.

The present invention also provides improved drying apparatus. The apparatus incorporates means for atomizing the material to be dried and projecting a stream of atomized material in a downstream direction. The apparatus also includes means for projecting a drying gas in turbulent flow towards the stream from opposite sides thereof, transversely to the downstream direction, so that the inwardly flowing drying gas is distributed along the length of the stream. Preferably, the drying gas projecting means is arranged to provide drying gas at different temperatures along the length of the stream. The atomizing and projecting means may include a nozzle, means for supplying an impelling gas to the nozzle and means for entraining the material to be dried in the impelling gas upstream of the nozzle throat.

Apparatus according to the present invention may be extraordinarily compact for a given drying capacity. In its preferred forms, the apparatus may have only one one-hundredth the volume of a standard spray dryer having equivalent capacity.

Other objects, features and advantages of the present invention will be apparent from the detailed description of certain embodiments set forth below, taken in conjunction with the accompanying drawings.

BRIEF DESCRIPTION OF THE DRAWINGS

FIG. 1 is a schematic, partially sectional, view of apparatus according to one embodiment of the present invention.

FIG. 2 is a fragmentary, schematic, sectional view on an enlarged scale, showing a portion of the apparatus illustrated in FIG. 1.

FIG. 3 is a schematic sectional view taken along line 3—3 in FIG. 1.

FIG. 4 is a schematic sectional view depicting a portion of apparatus according to a further embodiment of the present invention.

FIGS. 5 and 6 are fragmentary, schematic perspective views depicting apparatus according to still further embodiments of the present invention.

DETAILED DESCRIPTION OF THE EMBODIMENTS

Apparatus according to one embodiment of the present invention includes a nozzle assembly 10 mounted at the upstream end of a porous diffuser in the form of an elongated tubular shell 12. The nozzle assembly includes a gas tube 14 having a conical transition piece 16 (FIG. 2) at its downstream end. A nozzle 18 is mounted at the downstream end of the transition piece. The interior surface of the nozzle is a surface of revolution about the central axis 22 of the nozzle, converging to a throat or narrowest portion 24 at the downstream extremity of the nozzle.

A housing 26 is supported within the gas tube by centering screws 27, the housing terminating upstream of the nozzle. A feed tube 28 is mounted to the housing, the downstream end of the feed tube extending into the nozzle and terminating slightly upstream from the throat 24 of the nozzle. Thermal insulation surrounds the feed tube within the housing. Centering screws 27 maintain the housing, and hence the downstream end of the feed tube, coaxial with the nozzle.

The nozzle assembly is mounted so that nozzle 18 is coaxial with shell 12 and the downstream extremity of the nozzle is aligned with the upstream end of the shell. An end wall 29 extends between the nozzle and the wall of the shell, the end wall having a planar downstream face 30 flush with the downstream extremity of the nozzle.

The wall of shell 12 includes a frustoconical upstream collar 31 adjacent the nozzle assembly, and a cylindrical downstream collar 32 (FIG. 1) coaxial with the upstream collar. Each collar is formed from a porous sintered metal and defines many tiny pores or apertures uniformly distributed over its surface. Upstream collar 31 is disposed within a first housing 34 defining an annular channel or space 36 surrounding the upstream collar and confronting its exterior surface. Downstream collar 32 is disposed within a similar housing 38 defining a further annular channel 40, channels 36 and 40 being separated from one another by a wall 41. The downstream end of collar 38 is connected via an exit tube 42 to a conventional cyclone separator 44.

The feed tube 28 of the nozzle assembly is connected to a source 46 for supplying a liquid to be dried, which source may incorporate a conventional storage tank, pump and metering device. Gas tube 14 is connected to a source 48 for supplying a gas at a controllable temperature under a preselected pressure, and channels 36 and 40 are connected to similar independently controllable gas sources 50 and 52, respectively. The gas sources may incorporate conventional compressors, regulators, heat exchangers, and flow measurement devices.

In one process according to the present invention, an impelling gas supplied by source 48 through tube 14 flows through nozzle 18 at a high velocity. A liquid to be dried is forced by source 46 through the feed tube 28. As the liquid exits from the downstream end of the feed tube, it is entrained by impelling gas passing through nozzle 18 and atomized as the gas passes through the throat 24 of the nozzle so that a stream of droplets is projected from the nozzle along with the impelling gas. The impelling gas, with entrained droplets passes downstream from the nozzle as a generally conical jet 54 having its upstream-to-downstream axis coincident with the axis 22 of the nozzle and hence coincident with the lengthwise axis of the diffuser or shell 12.

Source 50 supplies a first portion of drying gas to annular channel 36. As channel 36 offers little resistance to flow, the pressure within the channel is substantially uniform. Accordingly, the exterior surface of collar 31 is exposed to a substantially uniform gas pressure around its entire circumference. The wall of collar 31 has substantially uniform porosity over its entire circumference, so that drying gas passes through the wall of the collar at an essentially uniform rate per unit of wall area about the circumference of the collar. As the pores of collar wall are microscopic and closely spaced, the gas streams emerging from adjacent pores merge with one another at microscopic distances from the interior surface of the collar, before the drying gas encounters the jet. Thus, the upstream region of the jet is surrounded by a continuous flux of drying gas moving radially inwardly toward the axis of the jet from outside the periphery of the jet, as depicted by the arrows in FIG. 3. The drying gas also has a low velocity downstream, parallel to the axis.

A second portion of the drying gas, supplied by source 52, passes through channel 40 and through the wall of downstream collar 32, so that the downstream region of the jet is surrounded by a similar continuous flux of drying gas. Adjacent the juncture of the two collars at boundary wall 41, the flux includes drying gas supplied through both collars.

The drying gas passes downstream with the impelling gas and the droplets. As the droplets pass downstream, the moisture in the droplets evaporates, so that the droplets are converted to dried particles before reaching exit tube 42. The particles and gases pass through the exit tube to separator 44, where the particles are separated from the gas and removed from the system.

The drying gas supplied through the wall of the shell penetrates into the jet and mixes with the impelling gas in the jet. Moreover, the flow of drying gas toward the axis of the jet promotes turbulence in the jet and hence promotes exchange of gases between the central or core region of the jet adjacent the axis and the peripheral region of the jet, remote from the axis. Such thorough mixing and continual addition of drying gas maintains the gases in all regions of the jet at the desired low humidity despite the continual transfer of moisture from the material being dried to the gases.

The temperature of each portion of the drying gas, and the temperature of the impelling gas, may be controlled independently. The first portion of the drying gas, supplied through upstream collar 31, mixes with the impelling gas and the material being dried in the upstream region, adjacent the nozzle, whereas the second portion of drying gas supplied through downstream collar 32 mixes with the other gases and material in the downstream region. Thus, the heat input to each region of the dryer, and hence the pattern of gas temperatures to which the material is exposed as it passes downstream, may be controlled as desired.

In many cases, it is preferred to expose the material to a relatively high gas temperature in the upstream region and a relatively low gas temperature in the downstream region. In the upstream region, the material has a relatively high moisture content and a large amount of heat is consumed in conversion of moisture to the vapor phase. In the downstream region, the material is relatively dry, so that less moisture is available for evaporation. Consequently, less heat is required for evaporation in the downstream region. By supplying the impelling gas and the drying gas to the upstream region at relatively high temperatures, and supplying the drying gas to the downstream region at a relatively low temperature, the heat input is closely matched to the heat requirement in each region of the drier. Thus, the heat supplied in the gases is efficiently used to effect the desired evaporation rather than wasted.

Moreover, by supplying the drying gas at different temperatures along the length of the jet, effective drying may be attained without raising the temperature of the material being dried beyond desirable limits. In the upstream region, where the material has substantial moisture content and substantial amounts of heat are consumed in evaporation, the temperature of the droplets is substantially lower than the temperature of the surrounding gases. The gases in the upstream region therefore may be maintained at a relatively high temperature to promote evaporation without unduly raising the temperature of the material being dried. As the material passes downstream and becomes progressively drier, the rate of evaporation decreases. With continued heat transfer from the gases to the material being dried, the temperature of the material approaches the temperature of the surrounding gases. The gas temperature in the downstream region should be limited to avoid overheating the material. By supplying the drying gas at different temperatures along the length of the stream, a high gas temperature may be maintained at the upstream region while maintaining a low gas temperature in the downstream region.

If the temperature of the drying gas supplied to the downstream region is low enough, the temperature of the mixed gases in the downstream region may be lower than the temperature of the material being dried. In that case, heat is transferred from the material to the gases. The dried material is thus cooled in the stream, before it is collected. The intimate exposure of the material to the gases achieved by projecting the drying gas transversely to the direction of the stream provides effective and rapid cooling. Although the term "drying gas" is used for the sake of convenience to designate the gas projected transversely of the stream, it should be understood that some or all of the drying gas utilized in cooling the material may contact the material after it is already dry. Some or all of the drying gas utilized in cooling may be projected downstream of the point along the length of the stream where the material reaches its final moisture content.

When the material is cooled in the stream, prior to collection, it is exposed to elevated temperatures only during the time required for drying. By contrast, in conventional spray drying processes, it is typically impracticable to cool the dried material prior to collection. In conventional processes, the dried material typically is collected at an elevated temperature and hence is susceptible to thermal degradation after collection.

In the embodiments described above, two portions of drying gas at the two different temperatures are employed. The desirable effects attained by supplying the drying gas at different temperatures to different regions along the length of the stream may be enhanced by supplying the drying gas in more than two portions to more than two regions. For example, three portions of the drying gas may be supplied at high, intermediate and low temperatures.

Other patterns of gas temperature may also be employed. Thus, if the impelling gas is supplied at a lower temperature than the drying gas projected towards the upstream region of the stream, the temperature of the mixed gases will be low immediately adjacent the nozzle and will increase progressively in the downstream direction within the upstream region. Thus, the temperature of the atomized material will be very low during the initial portion of the drying process. This effect may be enhanced by supplying the drying gas at a low temperature to the most upstream region and at a higher temperature to the next region. Low temperature during the initial phases of drying is useful with materials which are particularly sensitive to heat when moist but which became less sensitive as they become drier. For example, it is believed that coffee and tea extracts become less susceptible to loss of volatile aromas upon heating as they become drier.

In the arrangements described above, the flux or flow of drying gas is symmetrical about the axis of the jet. The inward flow of drying gas from each portion of the diffuser or shell wall is balanced by a like inward flow in the opposite direction from the diametrically opposed portion of the wall. The opposing flows of drying gas do not deflect the atomized material from the axis. However, as best appreciated with reference to FIG. 3., the drying gas tends to keep the atomized material away from the shell wall. Any droplet or particle moving outwardly toward the shell wall encounters the inwardly flowing gas and is deflected back towards the axis.

A jet of gas tends to entrain the surrounding gases, and hence tends to create a partial vacuum adjacent the upstream end of the jet. The partial vacuum in turn tends to cause the surrounding gases to flow upstream outside of the jet, thus creating recirculation. The inwardly flowing drying gas prevents such recirculation.

A jet is characterized by a distinctive profile of gas velocities, with higher velocities in the central region adjacent the axis and lower velocities in the peripheral region, remote from the axis. As the distinctive velocity profile associated with the jet dissipates, its entrainment demand or tendency to entrain gases from the surroundings diminishes, and hence its tendency to cause recirculation also diminishes. It is believed that the thorough mixing induced by the drying gas promotes transfer of momentum between the central region of the jet and the periphery of the jet. The drying gas thus promotes dissipation of the velocity profile of the jet and hence reduces its entrainment demand.

Moreover, the inwardly flowing drying gas supplied through the shell wall meets the remaining entrainment demand of the jet. The rate of drying gas flow through the shell wall per unit axial length adjacent the upstream end of the shell desirably exceeds the entrainment demand rate of the jet per unit length. Thus, there is some downstream flow of drying gas outside the jet. If the rate of drying gas flow per unit axial length through a downstream region of the shell wall is less than the entrainment demand rate of the jet, the excess drying gas flowing downstream can make up the deficiency. The reverse situation, with a deficiency of drying gas in the upstream region and an excess in the downstream region, is less desirable. There would be an upstream flow of gas outside of the jet, which could cause recirculation. Stated another way, the total rate at which the drying gas is projected towards any portion of the jet upstream of an arbitrary location along the length of the jet, and hence the total drying gas flow rate through the shell wall upstream of that arbitrary location, preferably equals or exceeds the total entrainment demand for that portion of the jet.

The actual entrainment demand of a jet decaying under the influence of the inwardly projected drying gas is not readily calculable. However, for a jet created by a given flow of impelling gas through a given nozzle, the actual entrainment demand rate will be less than the entrainment demand of the corresponding free jet, i.e., a jet of impelling gas having the same flow rate and issuing from the same nozzle into an infinite space without any inwardly projected drying gas. The entrainment demand per unit length E of such a free jet is approximated by the formula:

$$E = \frac{0.26\,(M_o)}{D}$$

Where:

$M_o$ is the mass flow rate of impelling gas through the nozzle; and

D is the diameter of the nozzle throat.

As used in this disclosure, the term "theoretical entrainment demand" refers to the entrainment demand for the corresponding free jet calculated according to the above formula. If the inward drying gas flow equals or exceeds the theoretical entrainment demand of the jet, then the drying gas flow will exceed the actual entrainment demand of the jet. The desired relationship may be expressed by the following formula:

$$\int_{x=o}^{x=q} R\,dx \geqq \int_{x=o}^{x=q} E\,dx$$

Where:

R is the rate of drying gas flow through the shell wall per unit axial length;

x is axial distance downstream from the throat of the nozzle; and q is an arbitrary value.

The aforementioned relationship between entrainment demand and drying gas flow preferably is maintained in the region immediately adjacent the nozzle, over an axial distance equal to or greater than 10 times the nozzle diameter, i.e., for any value of q between 0 and 10D. As the jet decays appreciably in that region, it is less important to maintain that relationship further downstream. However, maintainence of the specified relationship for distances greater than 10 nozzle diameters downstream, typically up to about 30 to 60 nozzle diameters, provides even greater assurance against recirculation.

It is believed that in drying processes according to preferred embodiments of the present invention, several factors coact to suppress of droplets or particles of the material being dried to the walls of the drying chamber. Adhesion typically results from impingement of moist material on the chamber wall; dry material typically will not adhere to the wall. The improved mixing and desirable gas temperature distributions attainable according to the present invention promote rapid drying and hence promote drying of the material before it can impinge on the wall. Recirculation tends to carry the material being dried outwardly, toward the chamber wall, and hence promotes impingement and adhesion. Suppression of recirculation by the drying gas thus serves to suppress adhesion. Also, the inwardly flowing drying gas tends to blow the material being dried inwardly, away from the chamber wall, further suppressing adhesion of the material to the wall.

To minimize impingement of moist material on the shell wall, the shell wall in the upstream region preferably is disposed outside the lateral boundary of the jet. A jet does not have discrete physical boundaries; at progressively greater distances from the axis of the jet, the velocity of the gas in the downstream direction declines, with no appreciable discontinuity between the jet and the surroundings. The lateral boundary of a free jet, undisturbed by inwardly flowing gas, is ordinarily taken as defined by a theoretical frustum of a cone spreading outwardly from the throat of the nozzle and having an included angle of about 23.5 degrees. Although the actual jet will spread to a lesser degree due to the effect of the drying gas, the free-jet approximation may be used in design of drying apparatus according to the present invention. Thus, the shell wall may be arranged so that the upstream region of the shell wall lies outside of the aforementioned frustum. In the downstream region, where the atomized material is substantially dry and impingement of the material on the shell wall is unimportant, the shell wall may be disposed within the theoretical frustum.

The shell wall desirably should either be parallel to the lengthwise axis of the shell or diverge from such axis at an angle less than or equal to about $3\frac{1}{2}$ degrees. Thus, a frustoconical shell wall preferably has an included angle no greater than about 7 degrees. If the shell wall is in the form of a surface of revolution other than a frustum of a cone, the generator of such surface should not diverge from the lengthwise axis at an angle greater than about 3½ degrees.

To provide the best interaction between the drying gas and the droplets, and to minimize the volume of the apparatus, the wall of the shell or diffuser should be disposed as close to the lengthwise axis as possible in keeping with the considerations set forth above. Although the present invention is not limited by any theory of operation, it is believed that turbulent eddies are created as the drying gas passes through the pores in the diffuser wall, and that these eddies contribute to the interaction between the drying gas and the droplets. Further, it is believed that these eddies decay as they move inwardly with the drying gas. Close juxtaposition of the diffuser wall and the stream of atomized material is believed to provide better exposure of the material to the eddies. Preferably, at least part of the diffuser wall is disposed within about 25 cm of the center of the stream to provide effective propagation of the eddies into the center of the stream. It is believed that the most effective interaction between the eddies and the dispersed material occurs adjacent the wall of the shell or diffuser. Accordingly, it is believed that those droplets which approach the wall are dried most rapidly, thus further suppressing adhesion of the atomized material to the wall.

The size of the pores is also believed to be significant. The size of the eddies created as the drying gas issues from the pores is directly related to the size of the pores. It is believed that the optimum interaction between the eddies and the atomized material occurs when the size of the eddies approximates the diameter of the droplets. To achieve this relationship, the sizes of the individual pores should be predominantly from about 0.1 to about 10 times, and preferably about 1.0 to about 5.0 times, the average diameter of the droplets produced in the atomization step. In this context, the "size" of a pore means the diameter of the largest rigid spherical particle which will pass through the pore.

Figure 3:
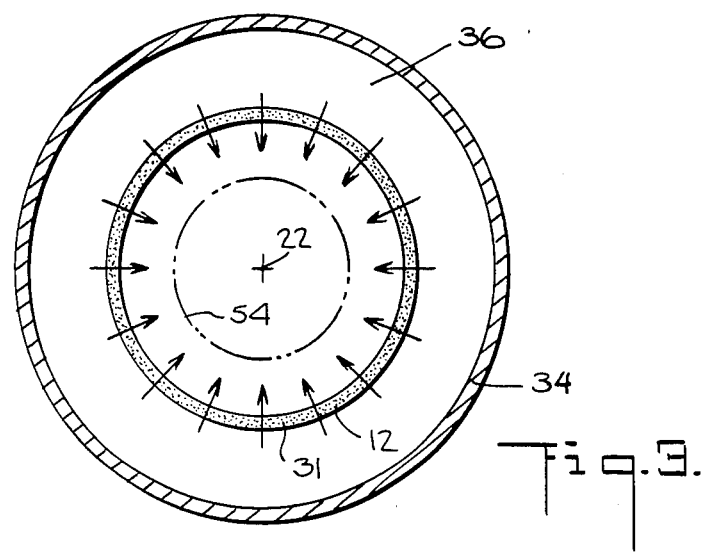
Figure 2:
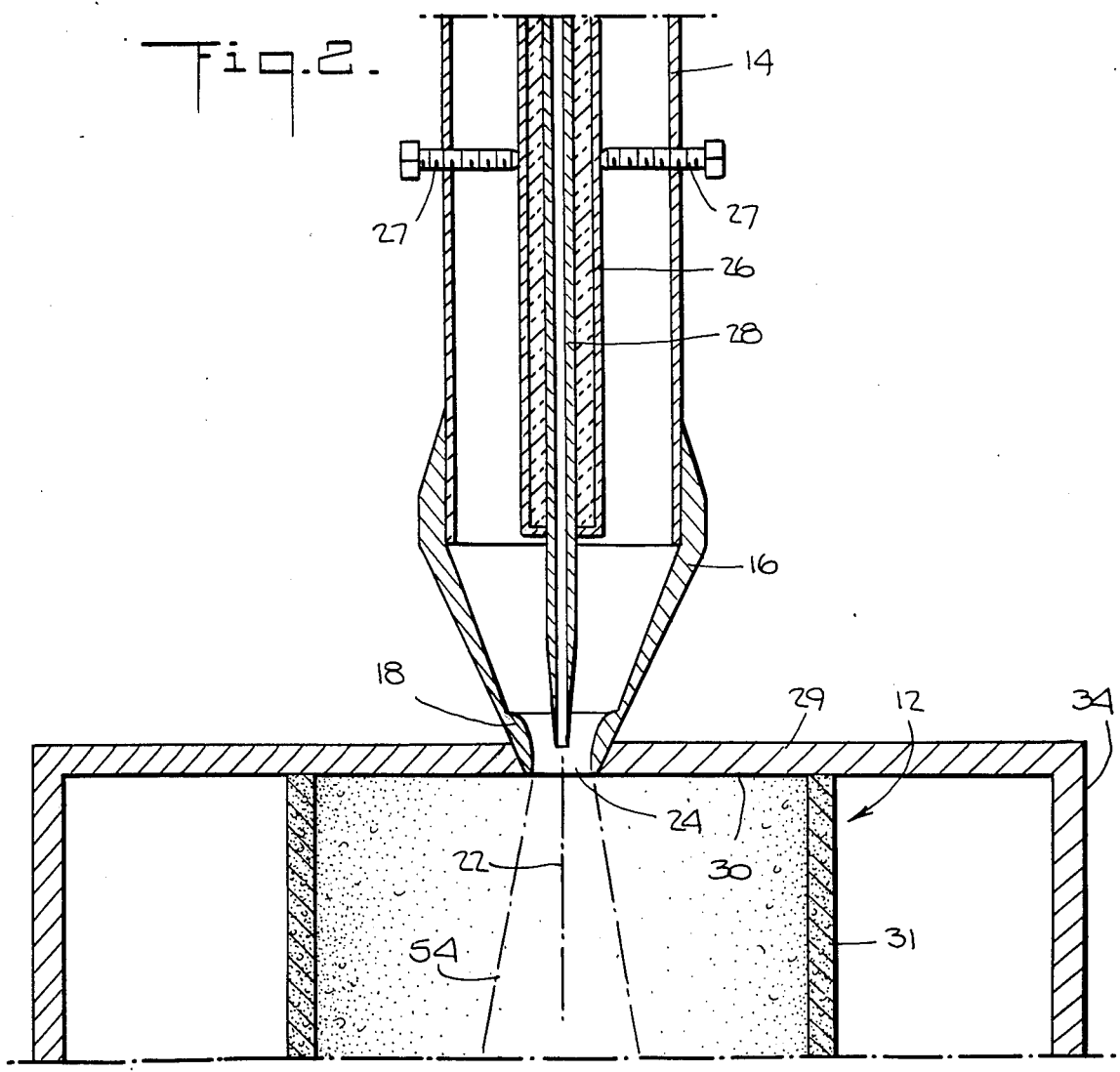
Figure 4:
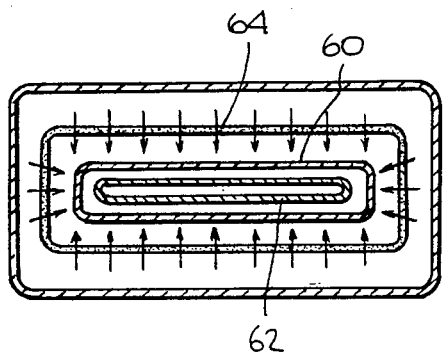

Apparatus according to a further embodiment of the present invention, schematically illustrated in FIG. 4, employs a nozzle 60 having an elongated, rectangular opening, a feed tube 62 having a rectangular outlet being disposed within the nozzle. The nozzle is directed into a tubular porous shell 64 of generally rectangular cross-section, the walls of the shell flaring outwardly toward the downstream end of the shell. Impelling gas supplied to nozzle 60 entrains and atomizes liquid supplied to feed tube 62. The gas exits from the nozzle as a jet of generally rectangular cross-section, carrying a stream of droplets with it. Drying gas is supplied through both the narrow sides and the wide sides of shell 64. Just as in the embodiments described above with reference to FIGS. 1-3, the jet is entirely surrounded by the drying gas projected inwardly from the porous shell, and the atomized material passes between opposing inward flows of drying gas.

The aforementioned relationships between the entrainment demand of the jet and the rate of drying gas flow through the shell apply to arrangements such as that of FIG. 4, employing a nozzle of noncircular cross-section. With a rectangular nozzle, the narrow dimension of the nozzle should be taken as the diameter of the nozzle. A jet issuing from a rectangular nozzle spreads outwardly in much the same manner as a jet issuing from a circular nozzle. The theoretical lateral boundary of a free jet issuing from a rectangular nozzle, unaffected by any inwardly-flowing gas, is in the form of an obelisk having sides extending from the edges of the nozzle, opposing sides of the obelisk defining included angles of about 23.5°. Again, although the jet is constrained to some extent by the drying gas, the theoretical free jet boundary may be used in initial design of the shell.

Figure 5:
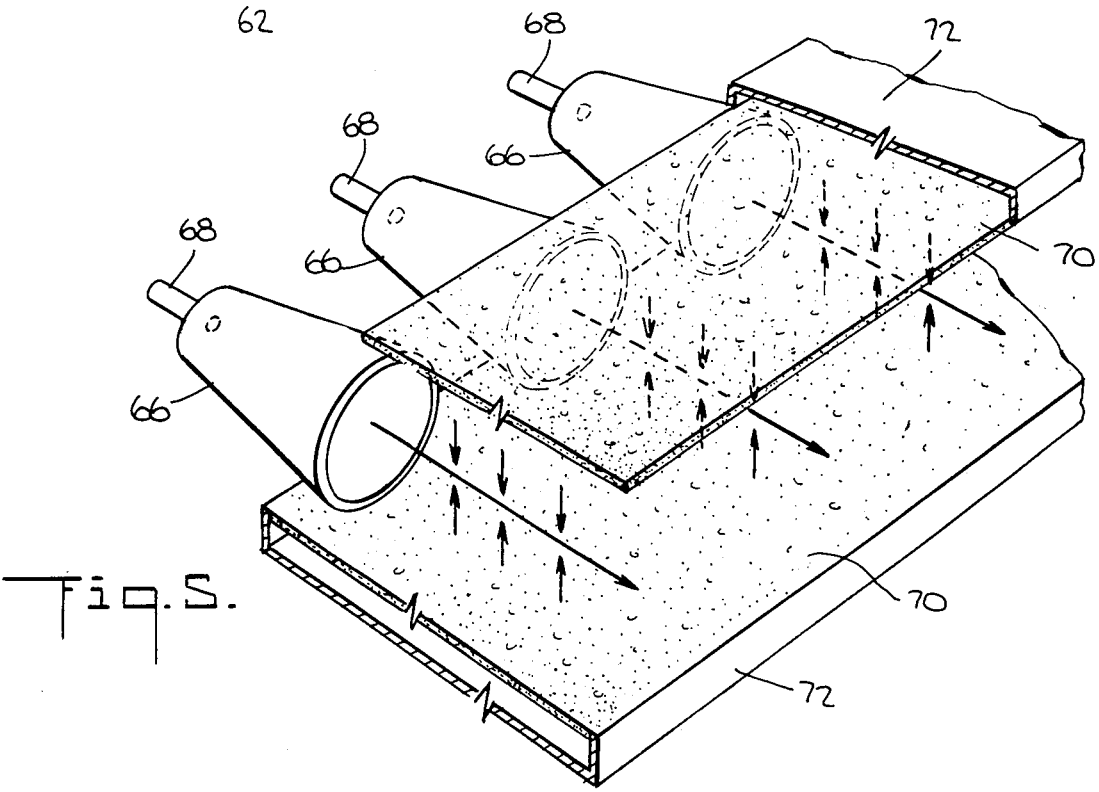

The apparatus illustrated in FIG. 5 incorporates a plurality of frustoconical porous shells 66 and associated gas tubes 68. Each gas tube is arranged to discharge an impelling gas into the associated shell through a nozzle, and liquid material to be dried is supplied through a feed tube (not shown) within each gas tube. Drying gas supplied through chambers (not shown) encircling the shells is projected through the shells. Thus, each shell operates in the same fashion as the upstream portion of the drying chamber described above with reference to FIGS. 1-3; the jet issuing from each nozzle is entirely surrounded, over the upstream portion of its length, by inwardly projected drying gas. The downstream ends of the shells are disposed between a pair of opposed porous plates 70, and additional drying gas is supplied via chambers 72 through the porous plates.

Gases and atomized material issuing from the shells pass between opposing inward flows of drying gas projected from the porous plates, as indicated by the arrows in FIG. 5. The drying gas issuing from the plates mixes under turbulent conditions with the atomized material and with the gases issuing from the shells. The streams of gas and atomized material issuing from the shells are not entirely surrounded by inwardly-projected drying gas as they pass between the plates. To minimize the possibility of recirculation in the regions between adjacent streams, the configuration of shells 66 and the drying gas flow through the shells are arranged so that the jet issuing from each nozzle is substantially dissipated within the associated shell. Thus, each shell preferably extends downstream from the associated nozzle for a distance at least 10 times the diameter of the nozzle, and drying gas preferably is supplied through each shell at a rate at least equal to the theoretical entrainment demand of the jet.

Figure 6:
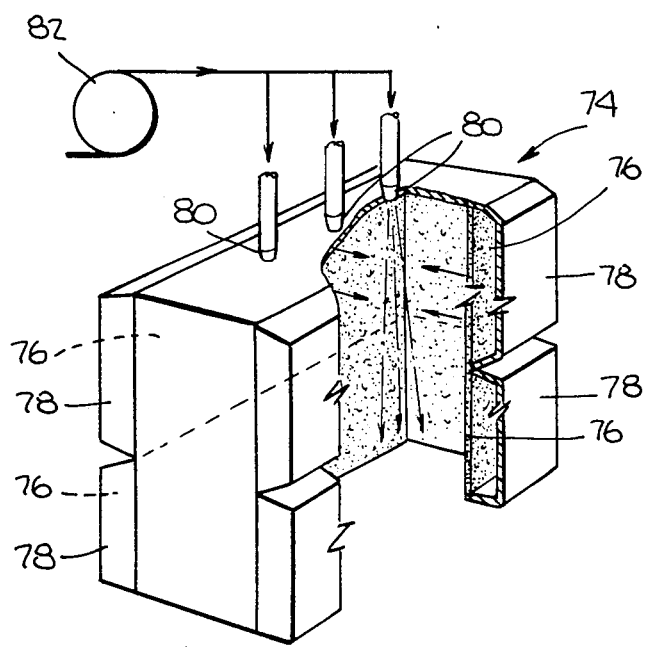

In the embodiments described above, the material is projected in a jet of impelling gas. However, the material may be atomized and projected without using an impelling gas. The apparatus illustrated in FIG. 6 includes a drying chamber 74 which is enclosed at its upstream end and at its sides. Two opposed sides of the drying chamber are defined by porous diffuser plates 76. Each porous plate communicates with chambers 78, the chambers being connected to gas sources (not shown). Atomizing nozzles 80 are mounted to the upstream wall of the chamber. Each atomizing nozzle has a plurality of fine orifices opening to the interior of the chamber. The atomizing nozzles are connected to a high-pressure pump 82.

A liquid to be dried is forced through nozzles 80 by pump 82, so that a stream of fine droplets passes downstream from each nozzle. Drying gas supplied via chambers 78 is projected through porous plates 76 towards the streams of droplets. The streams pass between opposing inward flows of drying gas distributed along the length of the streams and the dispersed liquid is effectively exposed to the drying gas under turbulent conditions. Preferably, porous plates 76, and hence the opposing inward flows of drying gas, extend downstream beyond the point where the material is substantially dry.

As the upstream end of the chamber is closed, continued flow of drying gas into the chamber forces the drying gas in the chamber downstream. The dried material is collected in a separator (not shown) connected to the downstream end of the chamber.

As there are no jets of impelling gas, there is no need to arrange the drying gas flow so as to prevent recirculation induced by such jets. Thus, the streams of droplets are not entirely surrounded by the inwardly-projected drying gas. Also, the heat required for drying is supplied entirely by the drying gas. Any liquid atomizing nozzle capable of providing the desired degree of atomization may be employed. In other respects, the drying operation is similar to those described above.

Regardless of the method of atomization, the required drying time varies markedly with the diameter of the droplets; larger droplets take longer to dry. Accordingly, atomization to an average droplet size of about 70 microns or less is preferred. Very large droplets which dry relatively slowly may impinge on the walls of the dryer while still moist, and hence may adhere to the walls. Ordinarily, the proportion of very large droplets varies directly with the degree of nonuniformity in the droplet diameter distribution and also varies directly with the average droplet diameter. Thus, the more uniform the droplet size distribution, the larger the average droplet diameter may be without encountering adhesion. Atomization to an average droplet diameter of about 63 microns, with 3% of the droplets above 212 microns diameter and 12.2% between 150 and 212 microns, may be employed successfully. Insofar the drying process is concerned, there is no lower limit on droplet diameter. The droplet diameters referred to herein are determined by measuring the diameter of the dried particles, on the assumption that the diameters of the dried particles are the same as the diameters of the droplets produced in the atomization step.

Liquid materials which are viscous or otherwise difficult to atomize, such as aqueous comestible materials of about 40% solids content or more, can best be atomized by entraining the liquid in impelling gas and passing the impelling gas through an orifice as described above with reference to FIGS. 1–5. Typically, the most effective atomization is attained when the impelling gas approaches or reaches sonic velocity at the nozzle throat.

The impelling and drying gases ordinarily are air, but other gases may be employed. Although the drying process ordinarily involves evaporation of water, materials bearing liquids other than water may also be dried. Sugar-based materials, such as solutions of sugar in water, honey and molasses enter a tacky, non-crystalline state upon drying and remain in that state for an appreciable period after drying is complete. To avoid adhesion problems in processing such materials, other materials may be admixed with the sugar-based material to provide nucleation sites and accelerate crystallization.

The present invention is particularly suitable for drying comestible liquids such as milk, aqueous extracts of coffee, chicory and tea, mixtures of such extracts, and combinations including such extracts together with sugar, molasses or honey. It is believed that the rapid drying, substantial absence of recirculation within the dryer and controlled product temperatures attainable with the present invention preserve the flavor of the product.

In typical embodiments of the invention for drying aqueous comestible liquids, the impelling gas temperature upstream of the nozzle typically is about 500° C. or less, drying gas is supplied to the upstream region at about 120° C. to about 210° C., and drying gas is supplied to the downstream region at less than about 80° C. The total mass flow rate of drying gas ordinarily is about 10 to 20 times the mass flow rate of the impelling gas. Under these conditions, typical comestible liquids can be dried effectively in industrial quantities with a residence time of the material in the dryer on the order of 50 milliseconds or less. The shell or drying chamber for such a process may be 1 to 2 meters in length, and less than 1 meter in diameter.

The following examples illustrate certain aspects of the present invention. Solids contents and moisture contents stated in the examples as percentages are percentages by weight.

EXAMPLE 1

Apparatus similar to that illustrated in FIGS. 1–3 is employed. The nozzle has a throat diameter of 18 mm. The shell is frustoconical, about 1 meter in length, about 7 cm inside diameter at its upstream end and about 33 cm inside diameter at its downstream end. The average pore size of the shell is about 30 microns. Aqueous coffee extract containing about 45% solids is pumped through the feed tube at about 70 kg/hr. 267 kg/hr of impelling air at about 410° C. are supplied to the nozzle: as the impelling air passes through the nozzle, it is cooled by expansion to about 310° C. 1662 kg/hr of drying air at about 160° C. are supplied through the upstream half of the shell, and 1948 kg/hr of drying air at about 42° C. are supplied through the downstream half of the shell. Air and dried material exit from the downstream end of the shell at about 80° C. The coffee extract is dried to particles of about 20–30 microns diameter and about 5% moisture.

There is no detectable accumulation of material on the shell wall. The beverage prepared from the dried product is preferred by tasters in a blind study over a beverage prepared from a powder obtained by conventional tower spray drying of the same extract.

EXAMPLES 2–6

The apparatus is as employed in Example 1, except that the shell has a frustoconical upstream section of about 22 cm inside diameter at its upstream end and about 32 cm inside diameter at its downstream end, and a cylindrical downstream section of about 32 cm inside diameter. Both sections have pores of about 30 microns average size. Air flow rates are measured as the air enters the system at room temperature and atmospheric pressure, prior to heating and compression. The impelling gas pressure and temperature are measured immediately upstream of the nozzle. The exit temperature is the temperature of the mixed gases and dried product in the exit tube, measured approximately 1 meter from the downstream end of the shell. In each case, about, 28,300 liters of drying gas are passed through each section of the shell per minute. The other parameters for each example are set forth in the table, below.

TABLE

| Example | Liquid | Impelling Gas Temp °C. Gauge Pressure Kilopascals Flow Rate Liters/Min | Drying Gas Upstream Section Temp °C. | Drying Gas Downstream Section Temp °C. | Exit Temp °C. | Product Moisture Content % Average Particle Diameter, Microns Yield, Kilograms Per Hour, Dry Basis |
|---|---|---|---|---|---|---|
| 2 | Coffee Extract 46% Solids | 312 103 6,800 | 170 | 103 | 92 | 3.66 50 67 |
| 3 | Coffee Extract 45% Solids | 153 98 6,800 | 170 | 91 | 85 | N.A. 63 34 |
| 4 | Coffee Extract and Caramelized Molasses 44% Solids | 316 104 3,680 | 139 | 86 | 95 | 2.6 29 33 |
| 5 | Coffee Extract and Sugar 30% Solids | 324 103 3,680 | 120 | 85 | 84 | 2.6 16 19 |
| 6 | Chicory Extract 44.5% Solids | 248 108 3,680 | 144 | 62 | 77 | 4.27 27 N.A. |

("N.A." indicates value not obtained)

EXAMPLE 7

A tea extract containing 44% solids is dried at a liquid feed rate of 115 kg/hr using the same equipment as in Examples 2–6, and using air as the impelling and drying gases. The impelling air flow rate is 317 kg/hr, and the total drying gas flow rate is 2860 kg/hr, evenly divided between the upstream and downstream sections of the porous shell. Immediately upstream of the nozzle, the impelling gas is at 93° C.; as it passes through the nozzle, it is cooled to about 28° C. Drying air is supplied through the upstream section of the shell at 246° C., and through the downstream section at 93° C. The atomized extract is thus exposed to mixed gases at low, high and intermediate temperatures in that order. The exit temperature is about 85° C. The product has a moisture content of about 3.5%.

EXAMPLE 8

Milk preconcentrated to about 48% solids is dried using the same procedure and equipment as in Example 7, save that the liquid feed rate is 170 kg/hr and the impelling air flow rate is 476 kg/hr. The exit temperature is about 65° C. and the product moisture content is about 5%.

What is claimed is:

1. A method of drying a liquid material comprising the steps of:

(a) atomizing the material and projecting a stream of the atomized material in a downstream direction; and (b) contacting the atomized material with a drying gas by projecting the drying gas in turbulent flow, transversely to said down-stream direction, towards the stream from opposite sides thereof, the drying gas being distributed along the length of the stream so that the atomized material passes between opposing inward flows of drying gas, whereby the drying gas mixes with the atomized material and the atomized material dries as it moves downstream.

2. A method as claimed in claim 1 wherein the material is atomized as it passes through a nozzle by passing an impelling gas through the nozzle to entrain the material in the impelling gas upstream of the throat of the nozzle and wherein the atomized material is projected downstream by the impelling gas in a jet, the atomized material being entrained in said jet.

3. A method as claimed in claim 2 wherein said drying gas is projected so that at least in an upstream region adjacent the nozzle, the jet is surrounded by inwardly flowing drying gas.

4. A method as claimed in claim 3 wherein said jet is of circular cross-section and said drying gas is projected so that at least in said upstream region the inward movement of drying gas is symmetrical about the axis of the jet.

5. A method as claimed in claim 3 wherein the drying gas is projected so that between the nozzle and 10 nozzle diameters downstream from the nozzle, the rate at which drying gas is projected is at least equal to the theoretical entrainment demand of the jet between the nozzle and 10 nozzle diameters downstream from the nozzle.

6. A method as claimed in claim 2 wherein the impelling gas is about at sonic velocity at the throat of the nozzle.

7. A method as claimed in claim 1 wherein drying gas at different temperatures is projected toward different regions along the length of the stream.

8. A method as claimed in claim 7 wherein the drying gas projected towards an upstream region is at a higher temperature than the drying gas projected towards a downstream region.

9. A method as claimed in claim 8 wherein the dried material is cooled by the drying gas projected towards said downstream region.

10. A method as claimed in claim 1 wherein the material is atomized to droplets of an average diameter less than about 70 microns.

11. A method as claimed in claim 1 wherein the drying gas is supplied through a porous diffuser, the size of the pores in the diffuser being between about 0.1 and about 10 times the average diameter of the droplets formed in said atomizing step.

12. A method as claimed in claim 1 wherein the liquid material is an aqueous comestible material.

13. A method as claimed in claim 12 wherein the aqueous comestible material is selected from the group consisting of milk, coffee extract, chicory extract, tea extract and mixtures thereof.

14. A method as claimed in claim 13 wherein at least one of the aqueous comestible materials is mixed with a material selected from the group consisting of sugar, molasses and honey.

15. A method as claimed in claim 14 wherein the liquid material contains at least about 40% solids by weight.

16. A method as claimed in claim 1 wherein the liquid material is atomized and projected by forcing it through atomizing nozzles by means of a high pressure pump.

17. Apparatus for drying a liquid material comprising:
(a) means for atomizing the material and projecting a stream of the atomized material in a downstream direction; and
(b) means for projecting a drying gas in turbulent flow, transversely to said downstream direction, towards the stream from opposite sides thereof so that the drying gas is distributed along the length of the stream and the drying gas mixes with the atomized material.

18. Apparatus as claimed in claim 17 wherein said drying gas projecting means includes a diffuser having opposed porous surfaces extending in said downstream direction and means for forcing the drying gas through said opposed surfaces, said atomizing and projecting means being operative to project the stream of atomized material between said opposed surfaces.

19. Apparatus as claimed in claim 18 wherein said diffuser includes a porous elongated tubular shell, said means for forcing the drying gas through the opposed surfaces includes means for applying the drying gas under pressure to the exterior surface of the shell, said atomizing and projecting means being operative to project the stream of atomized material into the shell in the lengthwise direction thereof.

20. Apparatus as claimed in claim 19 wherein said atomizing and projecting means includes a nozzle, having a throat, aligned with said shell, means for supplying an impelling gas to the nozzle under pressure, means for entraining the liquid material in the impelling gas upstream of the throat of the nozzle, the pressure of the impelling gas being such that the impelling gas and atomized material exit from the nozzle as a jet directed downstream within said shell.

21. Apparatus as claimed in claim 18 in which the interior surfaces of said nozzle and said shell are surfaces of revolution and are coaxial with one another.

22. Apparatus as claimed in claim 18 wherein said drying gas projecting means further includes means for projecting the drying gas at different temperatures through different portions of said opposed surfaces along the upstream-to-downstream extent thereof.

23. Apparatus as claimed in claim 17 wherein said atomizing and projecting means include a high pressure pump and atomizing nozzles.

* * * * *

UNITED STATES PATENT AND TRADEMARK OFFICE
CERTIFICATE OF CORRECTION

PATENT NO. : 4,702,799
DATED : October 27, 1987
INVENTOR(S) : James Tuot

It is certified that error appears in the above-identified patent and that said Letters Patent is hereby corrected as shown below:

On the title page, under the heading "U.S. Patent Documents", for Patent No. 3,620,776, "Miskin et al." should read -- Mishkin et al. --.

On the title page, under the heading "OTHER PUBLICATIONS", the reference identified as "Torck, et al." should be omitted.

At column 8, line 26, after "suppress" insert -- adhesion --.

At column 16, line 22, that is, in line 1 of claim 21, change "18" to -- 20 --.

Signed and Sealed this

Seventeenth Day of May, 1988

Attest:

DONALD J. QUIGG

Attesting Officer

Commissioner of Patents and Trademarks